United States Patent

Sato et al.

Patent Number: 6,149,826
Date of Patent: Nov. 21, 2000

[54] WATER PURIFICATION SYSTEM AND METHOD FOR EFFICIENTLY AND RELIABLY REMOVING VARIOUS POLLUTANTS DIFFERENT IN SIZE

[75] Inventors: Motoharu Sato, Honjo; Kazushige Watanabe, Maebashi; Takaaki Suga, Sawa-gun, all of Japan

[73] Assignee: Snaden Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/957,895

[22] Filed: Oct. 27, 1997

[30] Foreign Application Priority Data

Oct. 27, 1996 [JP] Japan .................................. 8-287145

[51] Int. Cl.[7] .......................... B01D 29/58; B01D 29/62; B01D 35/18
[52] U.S. Cl. .......................... 210/791; 210/266; 210/269; 210/315; 210/335; 210/342
[58] Field of Search .................... 210/266, 269, 210/274, 275, 277, 315, 256, 321.79, 321.88, 335, 337, 342, 791, 792, 748, 332, 407

[56] References Cited

U.S. PATENT DOCUMENTS

| | | | |
|---|---|---|---|
| 4,647,375 | 3/1987 | Czellér et al. | 210/274 |
| 5,071,551 | 12/1991 | Muramatsu et al. | 210/266 |
| 5,160,038 | 11/1992 | Harada et al. | 210/266 |
| 5,750,026 | 5/1998 | Gadkaree et al. | 210/502.1 |

FOREIGN PATENT DOCUMENTS 61-22594  2/1986  Japan .

*Primary Examiner*—Duane Smith
*Assistant Examiner*—Robert A. Hopkins
*Attorney, Agent, or Firm*—Banner & Witcoff, Ltd.

[57] ABSTRACT

In a water purification system in which a first filter (20) is placed in a flow of raw water for filtering the raw water to produce filtered water, a second filter (27) is placed downstream of the first filter for filtering the filtered water. The first filter is conductive and has a plurality of water passages through which the raw water flows. Each of the water passages of the first filter has a first diameter. At intervals, an electric voltage is applied to the first filter to destroy bacteria which is captured by the first filter. The second filter has a plurality of water passages through which the filtered water flows. Each of the water passages of the second filter has a second diameter smaller than the first diameter.

15 Claims, 1 Drawing Sheet

WATER PURIFICATION SYSTEM AND METHOD FOR EFFICIENTLY AND RELIABLY REMOVING VARIOUS POLLUTANTS DIFFERENT IN SIZE

BACKGROUND OF THE INVENTION:

This invention relates to a water purification system for purifying raw water such as tap water and groundwater to provide drinking water for domestic or business use.

In a water purification system of the type, sterilization of raw water is carried out in various manners. As a recent technical trend, use has widely been made of a hollow fiber membrane module (commercially available) for destroying microorganisms and bacteria and suppressing growth or propagation thereof. Use is also made of a unit for carry out electrolysis of the raw water and/or another unit for generating an appropriate amount of chlorine.

Generally, the raw water such as tap water and groundwater contains various pollutants, namely, residual chlorine such as hypochlorous acid (HClO$^-$), musty odor, trihalomethane, chlorinated organic compounds, pigments, and so on. In the water purification system as a water treatment system, the raw water is made to pass through a filter (typically, an activated carbon filter) to adsorb and remove the above-mentioned pollutants as adsorbed substances. Thus, the raw water is filtered or purified through the filter into filtered water.

With the lapse of time, the adsorbed substances will be accumulated in the filter and microorganisms and bacteria will be grown in the filter. The accumulation of the adsorbed substances and the growth of the microorganisms and the bacteria may prevent the raw water from smoothly flowing through the filter. This results in deterioration of the performance of the filter. In this connection, a reproducing operation is carried out after the above-mentioned purifying operation is continued for a predetermined time period. In the reproducing operation, the filter is applied with an electric voltage to generate the Joule heat. Such heat generation at the filter serves to desorb the adsorbed substances from the filter and to destroy and desorb the microorganisms and the bacteria grown on the filter. Desorbed substances as well as destroyed and desorbed microorganisms and bacteria are discharged through a drain pipe communicating with the filter.

However, the conventional water purification system described above has only one filter arranged in the system. It is assumed that the filter is designed for removal of chlorinated organic compounds as a main object and has a plurality of water passages each of which is of a diameter corresponding to the chlorinated organic compounds. In this event, standard plate count bacteria of a smaller size are allowed to pass through the filter. This results in growth of the bacteria in a pipe downstream of the filter.

On the other hand, the reproducing operation periodically performed requires a relatively long time in order to completely remove the chlorinated organic compounds adsorbed to the filter. During the reproducing operation, supply of the purified water is interrupted. In view of the usability, an interval of the reproducing operation can not be so shortened. However, if the interval is prolonged, the growth of the bacteria in the filter may possibly be caused to occur as described above.

In order to avoid the growth of the bacteria during the interval of the reproducing operation, it is proposed to incorporate a sterilizing operation in addition to the reproducing operation. The sterilizing operation is performed by applying an electric voltage to the filter in a short period of time.

However, although the effective destruction of the bacteria is enabled, such incorporation of the sterilizing operation has another problem that the destroyed bacteria will be mixed into the purified water during supply of the purified water following the sterilizing operation.

SUMMARY OF THE INVENTION:

It is therefore an object of this invention to provide a water purification system which is capable of efficiently and reliably removing various pollutants from raw water to produce purified water.

It is another object of this invention to provide a water purification system of the type described, which is capable of destroying bacteria included in the pollutants or the raw water.

It is still another object of this invention to provide a water purification system of the type described, which is capable of preventing the destroyed bacteria from being mixed into the purified water.

Other objects of this invention will become clear as the description proceeds.

According to this invention, there is provided a water purification system comprising a first filter placed in a flow of raw water for filtering the raw water to produce filtered water. The first filter is conductive and has a plurality of water passages through which said raw water flows. Each of the water passages has a first diameter. The water purification system further comprises voltage applying means connected to the first filter for applying an electric voltage to the first filter to destroy bacteria which is captured by the first filter, and a second filter placed downstream of the first filter for filtering the filtered water. The second filter has a plurality of water passages through which said filtered water flows. Each of said water passages of the second filter has a second diameter smaller than the first diameter.

DESCRIPTION OF PREFERRED EMBODIMENTS

Figure 1:
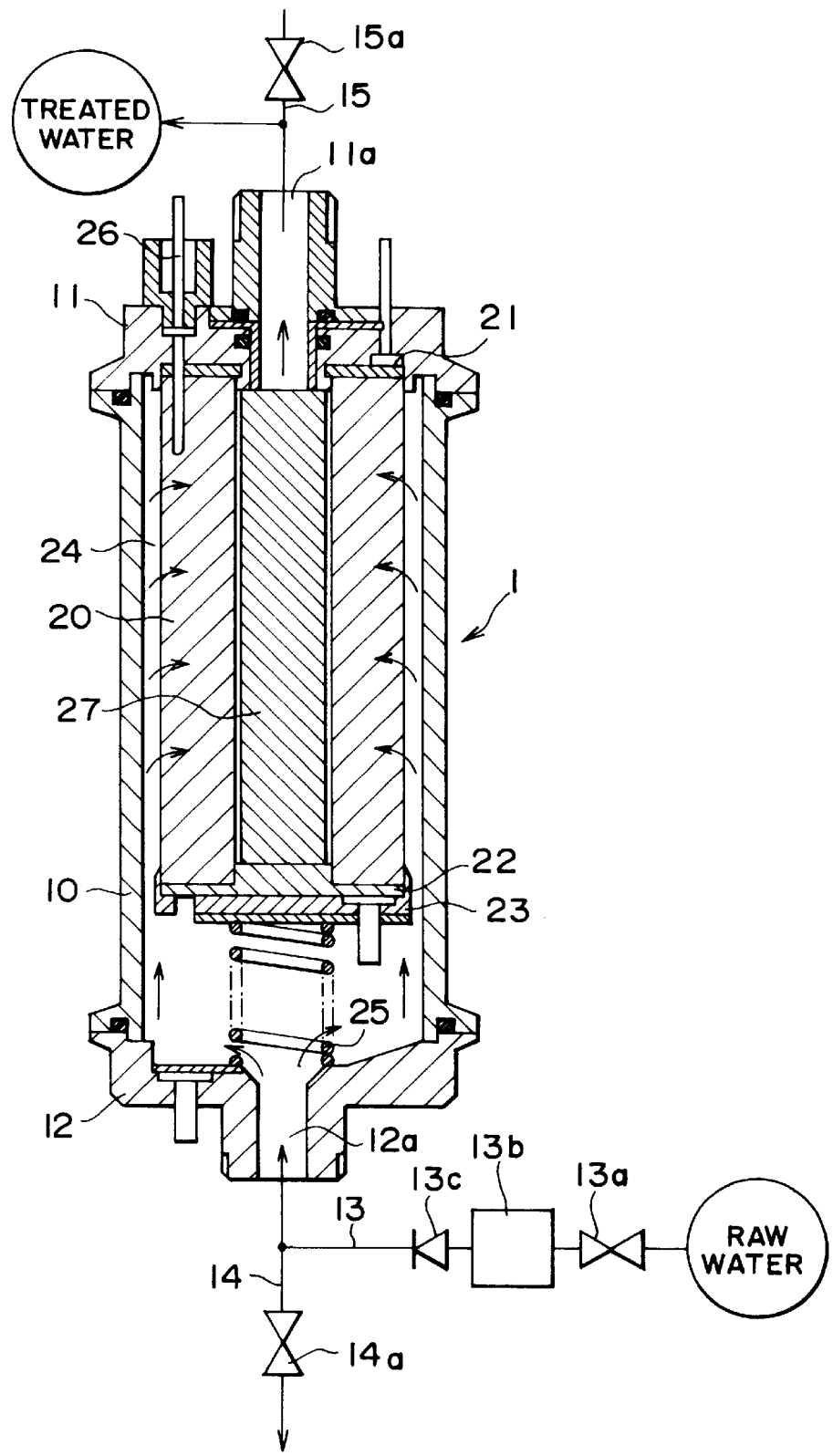
FIG. 1 is a sectional view of a water purification system according to an embodiment of this invention.

Now, description will be made as regards a preferred embodiment of this invention with reference to the drawing.

Referring to FIG. 1, a water purification system 1 according to one embodiment of this invention is for removing various pollutants such as trihalomethane and organic substances from raw water and comprises a cylindrical water tank 10 for storing the raw water such as tap water. The water tank 10 has upper and lower ends closed by upper and lower caps 11 and 12, respectively. Each of the water tank 10, and the upper and the lower caps 11 and 12 is made of an electrical insulating material, for example, polypropylene resin. The upper cap 11 is provided with an outlet port 11a communicating with a tap (not shown) which is for supplying purified water in the manner known in the art. The lower cap 12 is provided with an inlet port 12a for introducing the raw water into the water tank 10. The inlet port 12a is connected to a water supply pipe 13 with a water supply valve 13a, a prefilter 13b, and a check valve 13c. The water supply valve 13a is for allowing and inhibiting passage of the raw water. The check valve 13c serves to prevent backflow from the water tank 10. The inlet port 12a is also connected to a discharge pipe 14 with a discharge valve 14a. On the other hand, the outlet port 11a communicates with an air introduction pipe 15 with an air introduction valve 15a. When the air introduction valve 15a and the discharge valve 14a are closed with the water supply valve 13a opened, the raw water is supplied into the water tank 10. On the contrary, when the air introduction valve 15a and the discharge valve 14a are opened with the water supply valve 13a closed, the raw water is discharged from the water tank 10.

A first filter 20 of a cylindrical shape is placed in the water tank 10 for filtering the raw water to produce filtered water. The first filter 20 is formed by activated carbon fiber having conductivity and a large number of water passages each of which is of a first diameter between 400 and 500 $\mu$m. The first filter 20 has an upper end held by the upper cap 11 through a first electrode 21 of a flat shape and a lower end held by a holder 23 through a second electrode 22 of a flat shape. A combination of the first and the second electrode 21 and 22 is referred to as a voltage applying arrangement.

The holder 23 is made of an electrical insulating material, for example, polyphenylene resin. When an a.c. voltage is applied between the first and the second electrodes 21 and 22 at predetermined intervals, the first filter 20 generates the Joule heat to desorb trihalomethane and various organic substances adsorbed to the first filter 20 and to destroy and desorb bacteria grown on the first filter 20.

An annular path 24 is defined between an outer surface of the first filter 20 and an inner surface of the water tank 10 to communicate with the inlet port 12a. Within the water tank 10, the raw water introduced via the inlet port 12a flows into the first filter 20 through the path 24. A conductive coil spring 25 is interposed between the lower end of the first filter 20 and the lower cap 12. The coil spring 25 serves to urge the first filter 20 towards the upper cap 11 so that the first filter 20 is fixedly held in the water tank 10. The first filter 20 is provided with a temperature sensor 26 for detecting a temperature of the first filter 20.

In an inside of the first filter 20, a second filter 27 of a column shape is placed for filtering the filtered water to produce purified water. The second filter 27 has a large number of water passages each of which has a second diameter not greater than 0.5 $\mu$m. This means that the second diameter is smaller than the first diameter.

The second filter 27 comprises a hollow fiber membrane filter. The hollow fiber membrane filter comprises a bundle of several tens of thousands of hollow fibers each of which has an outer diameter of 45 $\mu$m and an inner diameter of 24 $\mu$m. The hollow fibers are formed by heat-resistant and pressure-resistant resin material having ability of separating the pollutants from the raw water or of filtering the raw water. Thus, the second filter 27 serves to capture pathogenic bacteria such as *Escherichia coli* (on the order of 2 $\mu$m) and Stapylococcus (4 $\mu$m).

Next, purifying, reproducing, and sterilizing operations of the water purification system will be described.

In the purifying operation, the air introduction valve 15a and the discharge valve 14a are closed while the water supply valve 13a is opened. Consequently, the raw water is supplied through the water supply valve 13a, the prefilter 13b, and the check valve 13c into the water tank 10. Within the water tank 10, the raw water flows through the path 24 into the first filter 20. Relatively large ones in size of the various pollutants are captured by the first filter 20 as captured substances. Then, the raw water flows into the second filter 27 to capture various kinds of bacteria having a relatively small size, for example, pathogenic bacteria such as *Escherichia coli* and Stapylococcus. Thus, the raw water is purified by the first and the second filters 20 and 27 into the purified water. The purified water is sent through the outlet port 11a to be supplied through the tap (not shown).

The above-mentioned purifying operation is repeatedly carried out in response to a water supply signal which is produced when the tap is opened. With the lapse of time, the captured substances are accumulated in the first filter 20 to cause growth or propagation of the bacteria. The accumulation of the captured substances and the growth of the bacteria may prevent the raw water from smoothly flowing through the first filter 20. This results in deterioration of the performance of the first filter 20. In view of the above, the captured substances and the bacteria must be removed from the first filter 20 to reproduce the first filter 20. To this end, the reproducing operation is carried out after the above-mentioned purifying operation is continued for a predetermined time period.

In the reproducing operation, the air introduction valve 15a and the discharge valve 14a are opened while the water supply valve 13a is closed. Consequently, the raw water in the water tank 10 is drained through the discharge valve 14a. After the raw water is drained, the a.c. voltage is applied between the first and the second electrodes 21 and 22 to heat the first filter 20. When the first filter 20 is heated, trihalomethane, the organic substances, and other various pollutants adsorbed or accumulated onto the first filter 20 are desorbed and the bacteria grown on the first filter 20 are destroyed and desorbed. After application of the a.c. voltage, the air introduction valve 15a and the discharge valve 14a are closed while the water supply valve 13a is opened again. Consequently, the raw water is supplied through the water supply valve 13a, the prefilter 13b, and the check valve 13c into the water tank 10 with a predetermined amount of the raw water. After the predetermined amount of the raw water is supplied to the water tank 10, the air introduction valve 15a and the discharge valve 14a are opened while the water supply valve 13a is closed. Consequently, the raw water in the water tank 10 is drained through the discharge valve 14a. Thus, trihalomethane, the organic substances, and the destroyed bacteria are discharged together with the raw water. Through a predetermined number of times of repetition of supplying and draining the raw water, the first filter 20 is washed. In the above-mentioned reproducing operation, the second filter 27 is also heated because the temperature in the water tank 10 rises when the first filter 20 is heated as described above. Therefore, the bacteria adsorbed to the second filter 27 are also destroyed.

The above-mentioned reproducing operation is repeated at the predetermined intervals. However, in each interval, the bacteria may be absorbed by to the first filter 20. In this connection, the first filter 20 is subjected to the sterilizing operation. The sterilizing operation is carried out by applying the a.c. voltage between the first and the second electrodes 21 and 22 at a desired timing when the reproducing operation is not carried out and the water supply valve 13a is closed. By the sterilizing operation, the first filter 20 is heated and sterilized in the manner similar to the reproducing operation. If the destroyed bacteria are desorbed from the first filter 20 during the sterilizing operation, they are captured by the second filter 27. Thus, it is possible to prevent the destroyed bacteria from being mixed in the purified water in the purifying operation subsequently carried out.

According to the water purification system 10, the various pollutants and the bacteria in the raw water can be efficiently captured by the first and the second filters 20 and 27. It is therefore possible to avoid the growth of the bacteria in the pipe downstream of the first and the second filters 20 and 27.

Furthermore, the captured bacteria are not concentrated to either one of the first and the second filters 20 and 27 which are therefore prevented from being filled with the captured bacteria to inhibit the smooth flow of the raw water therethrough. In addition, the destroyed bacteria desorbed from the first filter 20 are captured by the second filter 27 and prevented from being mixed into the purified water.

In the water purification system 1, the raw water drained in the reproducing operation is made to freely or naturally flow down by opening the air introduction valve 15a and the discharge valve 14a. If an aspirator (not shown) is provided at the side of the discharge valve 14a to suck the air in the water tank 10, the raw water in the water tank 10 can be drained by the use of the aspirator.

While the present invention has thus far been described in conjunction with the single preferred embodiment thereof, it will readily be possible for those skilled in the art to put this invention into practice in various other manners. The second filter is not restricted to the hollow filter membrane filter described above but may be any other type as far as the water passage diameter of 0.5 μm or less can be assured. For example, use may be made of a laminated filter comprising a plurality of sheet-like filter films stacked to form an annular structure. Alternatively, use may also be made of a tubular film filter comprising a heat-resistant and pressure-resistant pipe with a number of water passages formed in its wall and a sheet-like filter film attached to the pipe. Instead of the resin material, the filter may be formed by a metal material such as stainless steel. Alternatively, use may be made of a compressed activated carbon filter obtained by pressure-forming activated carbon powder.

What is claimed is:

1. A water purification system comprising:
   a cylindrical first filter positioned in a flow of raw water for filtering said raw water to produce filtered water, said first filter including conductive activated carbon fiber, and having a plurality of water passages through which said raw water flows, each of said water passages of the first filter having a first diameter;
   a column shaped second filter downstream of said first filter for filtering said filtered water, said second filter having a plurality of water passages through which said filtered water flows, each of said water passages of the second filter having a second diameter smaller than said first diameter, said second filter being inserted in said first filter;
   voltage applying means connected to said first filter for applying an electric voltage to said first filter to heat said first filter to a temperature capable of destroying bacteria captured by said first filter; and
   a thermally conductive member extending from said first filter to said second filter such that heat from said first filter conducts through said member to heat said second filter to a temperature capable of destroying bacteria captured by said second filter.

2. The water purification system of claim 1, wherein said first and said second filters define a narrow gap therebetween.

3. The water purification system of claim 2, wherein said gap extends along said first and second filters such that filtered water flows directly through said gap radially from said first filter to said second filter.

4. The water purification system of claim 1, further including
   a passage for directing said flow of the raw water to an outer periphery of said first filter;
   a second passage for directing said flow of water from said first filter to said second filer; and
   a third passage for directing said flow of water away from said second filter.

5. The water purification system of claim 1, wherein said first diameter is between 400 and 500 μm.

6. The water purification system of claim 1, wherein said second filter comprises a plurality of hollow fibers each of which is formed by resin material having the ability to filter said raw water.

7. The water purification system of claim 6, wherein said second diameter is not greater than 0.5 μm.

8. The water purification system of claim 1, wherein said thermally conductive member is an electrode.

9. A method for purifying raw water comprising the steps of:
   positioning a electrically conductive first filter in a flow of raw water to produce a flow of filtered water;
   positioning a second filter within the flow of filtered water to further filter the water;
   extending a thermally conductive member between the first and second filters;
   heating the first filter such that it destroys bacteria captured by the first filter; and
   transmitting heat generated by the first filter to the second filter through the thermally conductive member such that it destroys bacteria captured by the second filter.

10. The method of claim 9, wherein the conductive first filter contains conductive activated carbon fiber.

11. The method of claim 10, wherein said heating the first filter includes applying a voltage to the conductive activated carbon fiber.

12. The method of claim 9, wherein;
   the first filter is cylindrical and has water passages having a first diameter; the second filter has water passages having a second diameter; and
   said positioning a second filter includes positioning the second filter within the cylindrical first filter.

13. The method of claim 12, wherein the first diameter is larger than the second diameter.

14. The method of claim 9, wherein the said heating the first filter is performed at predetermined intervals.

15. The method of claim 9, wherein the said heating the first filter is automatically performed at predetermined intervals.

* * * * *

UNITED STATES PATENT AND TRADEMARK OFFICE
CERTIFICATE OF CORRECTION

PATENT NO. : 6,149,826
DATED : November 21, 2000
INVENTOR(S) : Motoharu SATO, et al.

It is certified that error appears in the above-identified patent and that said Letters Patent is hereby corrected as shown below:

In Claim 4, column 6, line 11, delete "filer" and insert --filter--.

Signed and Sealed this

Twenty-ninth Day of May, 2001

Attest:

NICHOLAS P. GODICI

*Attesting Officer*      *Acting Director of the United States Patent and Trademark Office*